United States Patent
Kim (10) Patent No.: US 9,959,230 B2
(45) Date of Patent: May 1, 2018

(54) DATA TRANSFER DEVICE

(71) Applicant: SK hynix Inc., Icheon-si, Gyeonggi-do (KR)

(72) Inventor: Chang Hyun Kim, Seoul (KR)

(73) Assignee: SK hynix Inc., Icheon-si, Gyeonggi-do (KR)

( * ) Notice: Subject to any disclaimer, the term of this patent is extended or adjusted under 35 U.S.C. 154(b) by 149 days.

(21) Appl. No.: 15/066,115

(22) Filed: Mar. 10, 2016

(65) Prior Publication Data

US 2017/0153995 A1    Jun. 1, 2017

(30) Foreign Application Priority Data

Nov. 30, 2015   (KR) .................. 10-2015-0169378

(51) Int. Cl.
*G06F 13/36* (2006.01)
*H03M 1/12* (2006.01)
*G06F 13/362* (2006.01)
*G06F 13/40* (2006.01)

(52) U.S. Cl.
CPC ........ *G06F 13/362* (2013.01); *G06F 13/4068* (2013.01)

(58) Field of Classification Search
None
See application file for complete search history.

(56) References Cited

U.S. PATENT DOCUMENTS

| | | | |
|---|---|---|---|
| 5,717,874 A * | 2/1998 | Ishiwata | H04N 1/32561 345/531 |
| 6,289,011 B1 | 9/2001 | Seo et al. | |
| 6,657,574 B1 * | 12/2003 | Rhode | H03M 1/1205 341/141 |
| 6,874,043 B2 | 3/2005 | Treggiden | |
| 2008/0086582 A1 * | 4/2008 | Park | G06F 13/4018 710/305 |

FOREIGN PATENT DOCUMENTS

KR    100212064 B1    8/1999

* cited by examiner

*Primary Examiner* — Hyun Nam
(74) *Attorney, Agent, or Firm* — William Park & Associates Ltd.

(57) ABSTRACT

A data transfer device includes a shifter block that generates first and second input signals and first and second output signals, an input/output control block that selects the first input signal and the first output signal in correspondence to a mode signal and outputs an input control signal and an output control signal for controlling a data input/output operation, or selects the second input signal and the second output signal and outputs the input control signal and the output control signal, and a buffer block that latches first input data or second input data which have different data bit widths according to the input control signal, and outputs first output data or second output data which have different data bit widths according to the output control signal.

20 Claims, 9 Drawing Sheets

DATA TRANSFER DEVICE

CROSS-REFERENCES TO RELATED APPLICATION

The present application claims priority under 35 U.S.C. § 119(a) to Korean application number 10-2015-0169378, filed on Nov. 30, 2015, in the Korean Intellectual Property Office, which is incorporated herein by reference in its entirety.

BACKGROUND

1. Technical Field

Various embodiments generally relate to a data transfer device, and more particularly, to a data transfer device capable of reducing the latch size of a buffer.

2. Related Art

In general, when data is transmitted among processors, since there is a difference in data processing speeds of the processors, a waiting state occurs while the data is being transmitted. In order to substantially prevent such a situation and shorten a data processing speed, a FIFO (First-In First-Out) buffer serves as a buffering storage device.

The FIFO buffer is provided among the processors to perform buffering for receiving and outputting transmission data. In a method for processing the data transmitted from the FIFO buffer, the firstly inputted data is firstly outputted.

The FIFO buffer substantially manages data input/output by using a write pointer and a read pointer. Such a FIFO buffer is variously used in a semiconductor system such as a SoC (System on chip).

Since the FIFO buffer has the pointers in a write side and a read side, the two pointers are used as a pair. The pointers indicate a direction in which data should be transmitted, indicate whether transmission is being performed, or indicate whether transmission has been completed according to addresses thereof.

SUMMARY

In an embodiment, a data transfer device includes a shifter block that generates a first input signal and a second input signal with different data formats, and a first output signal and a second output signal which have different data formats. The data transfer device also includes an input/output control block that selects the first input signal and the first output signal according to a mode signal and outputs an input control signal and an output control signal for controlling a data input/output operation, or selects the second input signal and the second output signal and outputs the input control signal and the output control signal. The data transfer device also includes a buffer block that latches first input data or second input data with different data bit widths according to the input control signal, and outputs first output data or second output data which have different data bit widths according to the output control signal.

In an embodiment, a data transfer device includes a first shifter configured to output a first input signal and a first output signal. The data transfer device also includes a second shifter configured to output a second input signal and a second output signal. The data transfer device also includes an input/output control block configured to receive the first and second input signals and the first and second output signals to output output control signals and input control signals. Further, the data transfer device also includes a buffer block configured to receive the input control signals and the output control signals and output first output data and second output data.

In an embodiment, a data transfer device includes a shifter block configured to generate a first input signal, a second input signal, a first output signal and a second output signal. The data transfer device also includes an input/output control block configured to output input control signals and output control signals in response to the first input signal, the second input signal, the first output signal and the second output signal. The data transfer device also includes a buffer block configured to receive the input control signals and the output control signals and output first output data and second output data.

Wherein the buffer block is configured to receive a selection control signal and first input data and second input data from the input/output control block.

Wherein the buffer block selects first input data or second input data according to a first mode signal and a second mode signal.

Wherein the buffer block selects the first input data when the first mode signal is activated.

Wherein the buffer block selects the second input data when the second mode signal is activated.

Wherein when the input control signals are applied, the buffer block stores input data in corresponding latches.

Wherein when the output control signals are applied, the buffer block outputs the second output data stored in a corresponding index.

Wherein the buffer block selectively outputs the first output data according to a selection control signal.

Wherein the buffer block outputs the second output data when a selection control signal is deactivated.

Wherein the buffer block selects either the first input data or the second input data according to a first mode signal or a second mode signal.

Wherein the buffer block selects the first input data or the second input data according whether the first mode signal or the second mode signal has been activated.

Wherein the buffer block sequentially latches the first input data and the second input data according to the input control signals.

Wherein the buffer block is shared when the first shifter and the second shifter have different data formats.

Wherein the shifter block comprises: a first shifter and a second shifter configured to share the buffer block.

DETAILED DESCRIPTION

Hereinafter, a data transfer device will be described below with reference to the accompanying figures through various examples of embodiments.

Figure 1:
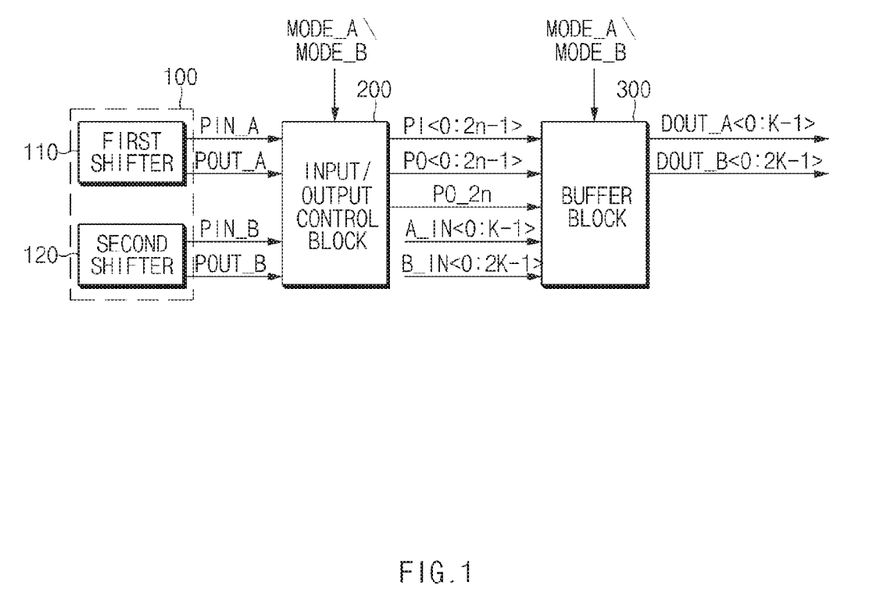
FIG. 1 is a configuration diagram illustrating a data transfer device according to an embodiment of the invention. Various embodiments are directed to reduce an area of a data transfer device by allowing latches to be shared by indexed data with different sizes. According to the invention, latches are allowed to be shared by indexed data with different sizes, so that it is possible to reduce an area of the data transfer device.

Referring to FIG. 1, a configuration diagram illustrating a data transfer device according to an embodiment of the invention is described. Moreover, all of the internal components of the data transfer device may be configured as circuits or the like.

An embodiment of the invention includes a shifter block 100, an input/output control block 200, and a buffer block 300.

The shifter block 100 generates input signals PIN_A and PIN_B having data formats different from each other and output signals POUT_A and POUT_B having data formats different from each other. Such a shifter block 100 includes a first shifter 110 and a second shifter 120.

The first shifter 110 outputs the input signal PIN_A and the output signal POUT_A in which the data format has been set to "A" to the input/output control block 200. The second shifter 120 outputs the input signal PIN_B and the output signal POUT_B in which the data format has been set to "B" to the input/output control block 200.

When the data format is set to "A", it represents that data latency is long and a data bit width is small. When the data format is set to "B", it represents that the data latency is short and the data bit width is large.

Such first shifter 110 and second shifter 120 delay signals having data formats different from each other. In an embodiment of the invention, the first shifter 110 and the second shifter 120 have data formats different from each other, but share one buffer block 300.

The input/output control block 200 outputs control signals for controlling a data input/output operation of the buffer block 300 in correspondence to the input signals PIN_A and PIN_B, the output signals POUT_A and POUT_B, and mode signals MODE_A and MODE_B.

Such an input/output control block 200 outputs, to the buffer block 300, input control signals PI<0:2n−1> for controlling data input, output control signals PO<0:2n−1> for controlling data output, and a selection control signal PO_2n.

The input/output control block 200 selects the output of the first shifter 110 or the output of the second shifter 120 according to the mode signal MODE_A and the mode signal MODE_B.

When the mode signal MODE_A has been activated, the input/output control block 200 selects the input signal PIN_A and the output signal POUT_A applied from the first shifter 110 and outputs the input control signals PI<0:2n−1>, the output control signals PO<0:2n−1>, and the selection control signal PO_2n.

When the mode signal MODE_B has been activated, the input/output control block 200 selects the input signal PIN_B and the output signal POUT_B applied from the second shifter 120 and outputs the input control signals PI<0:2n−1>, the output control signals PO<0:2n−1>, and the selection control signal PO_2n.

The buffer block 300 receives an indexed pulse signal and controls data input/output to be performed. Such a buffer block 300 buffers input data A_IN<0:K−1> and B_IN<0:2K−1> in correspondence to the input control signals PI<0:2n−1>, the output control signals PO<0:2n−1>, and the selection control signal PO_2n. The buffer block 300 then outputs output data DOUT_B<0:2K−1> and DOUT_A<0:K−1>.

The input data A_IN<0:K−1> indicates K pieces of data and has a small data bit width. The input data B_IN<0:2K−1> indicates 2K pieces of data and has a large data bit width.

The output data DOUT_A<0:K−1> indicates K pieces of data and has a small data bit width. The output data DOUT_B<0:2K−1> indicates 2K pieces of data and has a large data bit width.

In an embodiment of the invention, the data bit width of the input data B_IN<0:2K−1> may have a size twice as large as the input data A_IN<0:K−1>. Furthermore, in an embodiment of the invention, the data bit width of the output data DOUT_B<0:2K−1> may have a size twice as large as the output data DOUT_A<0:K−1>.

As described above, in an embodiment of the invention, even when the first shifter 110 and the second shifter 120 have data formats different from each other, one buffer block 300 is shared so that data transfer is possible.

Figure 2:
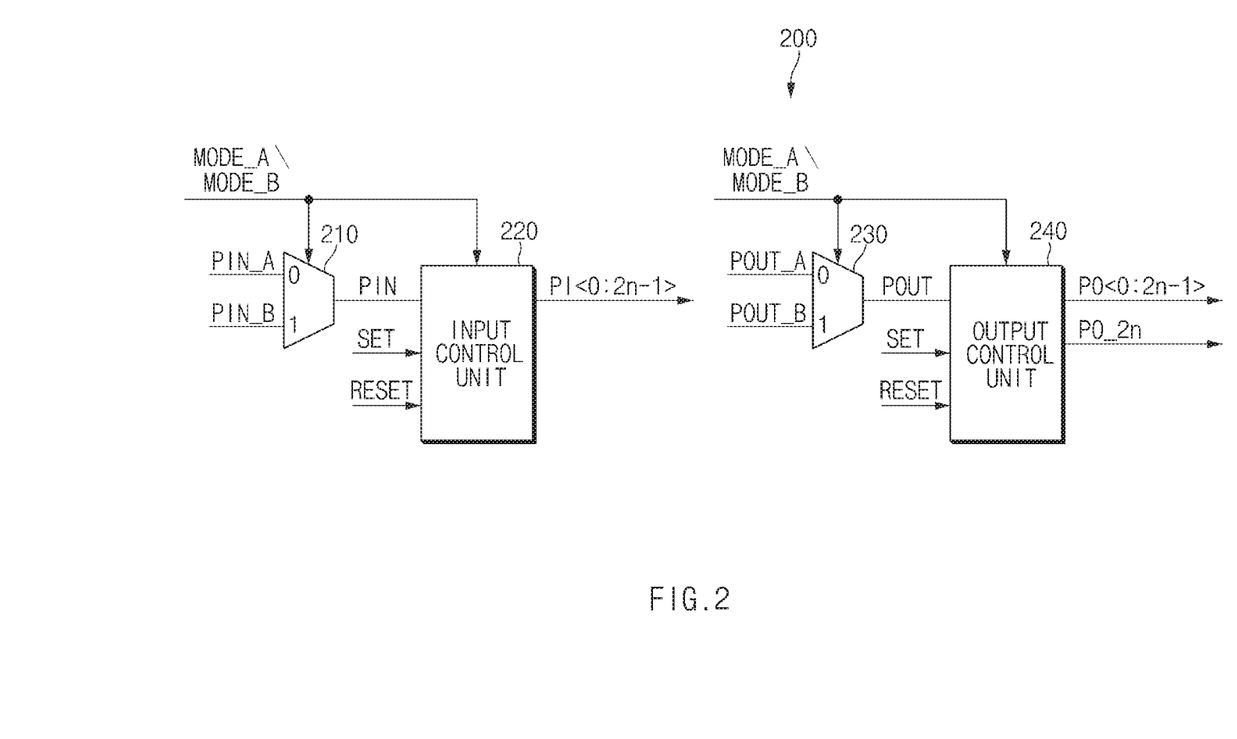
FIG. 2 is a detailed configuration diagram illustrating an input/output control block of FIG. 1.

Referring to FIG. 2, a detailed configuration diagram illustrating the input/output control block of FIG. 1 is described.

The input/output control block 200 includes selection units 210 and 230, an input control unit 220, and an output control unit 240.

The selection unit 210 selects any one of the input signal PIN_A and the input signal PIN_B in correspondence to the mode signal MODE_A and the mode signal MODE_B, and outputs an input signal PIN. For example, when the mode signal MODE_A has been activated, the selection unit 210 selects the input signal PIN_A, and when the mode signal MODE_B has been activated, the selection unit 210 selects the input signal PIN_B. Such a selection unit 210 may include a multiplexer.

The input control unit 220 outputs the input control signals PI<0:2n−1> in correspondence to the input signal PIN, the mode signal MODE_A, and the mode signal MODE_B. The input control unit 220 may be set by a set signal SET, and may be reset by a reset signal RESET.

The selection unit 230 selects any one of the output signal POUT_A and the output signal POUT_B in correspondence to the mode signal MODE_A and the mode signal MODE_B. The selection unit 230 then outputs an output signal POUT. For example, when the mode signal MODE_A has been activated, the selection unit 230 selects the output signal POUT_A. Further, when the mode signal MODE_B has been activated, the selection unit 230 selects the output signal POUT_B. Such a selection unit 230 may include a multiplexer.

The output control unit 240 outputs the output control signals PO<0:2n−1> in correspondence to the output signal POUT, the mode signal MODE_A, and the mode signal MODE_B. The output control unit 240 may be set by the set signal SET, and may be reset by the reset signal RESET. Furthermore, the output control unit 240 outputs the selection control signal PO_2n for selecting the output of the buffer block 300.

Figure 3:
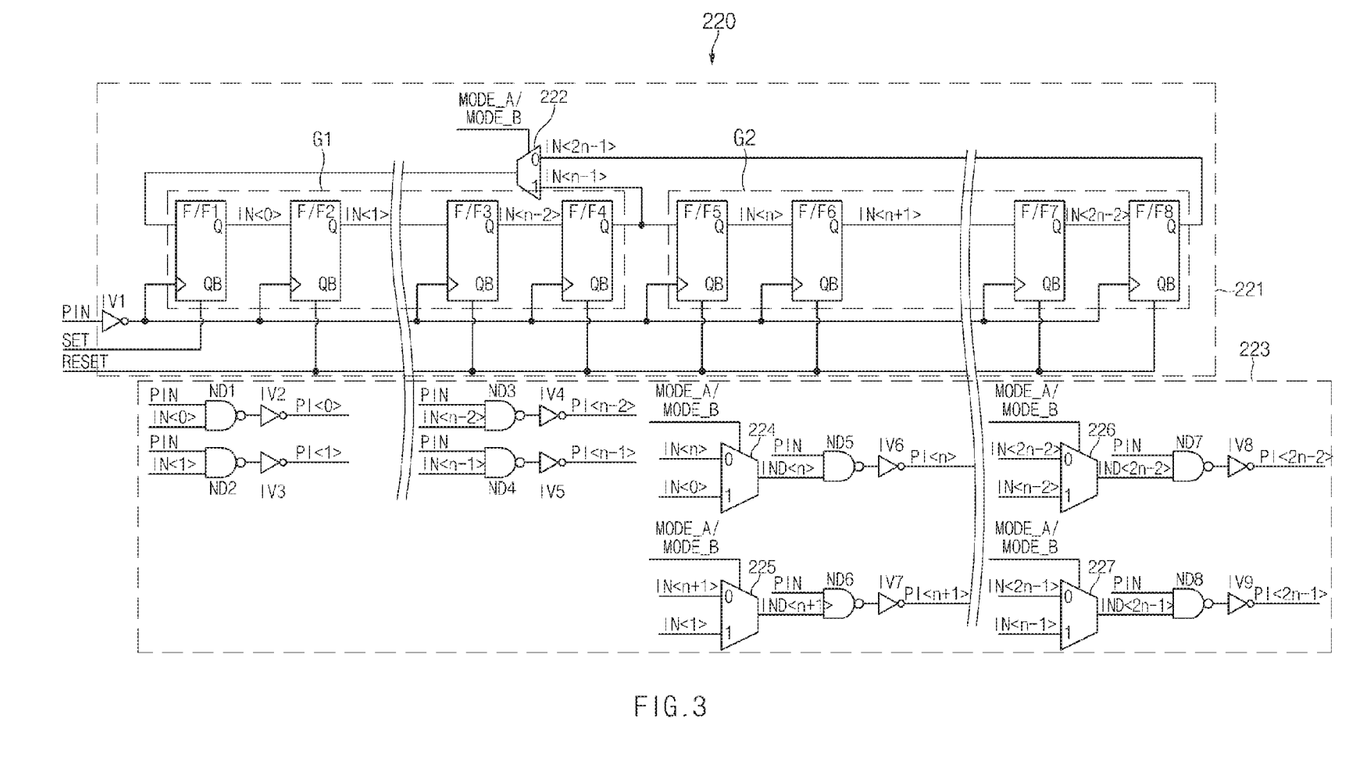
FIG. 3 is a detailed circuit diagram illustrating an input control unit of FIG. 2.

Referring to FIG. 3, a detailed circuit diagram illustrating the input control unit 220 of FIG. 2 is described.

The input control unit 220 includes a signal generation section 221 and a combination section 223.

The signal generation section 221 sequentially activates and outputs counting signals IN<0:2n−1> in correspondence to the input signal PIN.

The signal generation section 221 includes an inverter IV1, a plurality of flip-flops F/F1 to F/F8, and a selection part 222. The plurality of flip-flops F/F1 to F/F8 may be configured by a serially coupled ring counter and 2n flip-flops may be electrically coupled to one another. In the plurality of flip-flops F/F1 to F/F8, the size of a ring may be changed according to the mode signals MODE_A and MODE_B.

In the plurality of flip-flops F/F1 to F/F8, logic levels of the counting signals IN<0:2n−1> change in synchronization with a rising edge or falling edge time point of the input signal PIN. Furthermore, the input signal PIN inverted by the inverter IV1 is applied to the plurality of flip-flops F/F1 to F/F8 through clock input terminals thereof. As the input signal PIN is low-triggered, a counting operation of the plurality of flip-flops F/F1 to F/F8 is performed.

Among the plurality of flip-flops F/F1 to F/F8, an initial operation of the flip-flop F/F1 of the first stage is set by the set signal SET. The other flip-flops F/F2 to F/F8 may be initialized by the reset signal RESET.

The plurality of flip-flops F/F1 to F/F8 may be divided into two groups G1 and G2. The group G1 and the group G2 may include substantially the same number of flip-flops F/F.

When the mode signal MODE_A is activated, the flip-flops F/F1 to F/F8 of the groups G1 and G2 including 2n counters are all used. However, when the mode signal MODE_B is activated, only the flip-flops F/F1 to F/F4 of the group G1 are used.

The group G1 outputs the counting signals IN<n−1> of the flip-flop F/F4 positioned at the center of the plurality of flip-flops F/F1 to F/F8. The group G2 outputs the counting signals IN<2n−1> of the flip-flop F/F8 positioned at the last stage of the plurality of flip-flops F/F1 to F/F8.

The selection part 222 selects any one of the counting signals IN<n−1> of the group G1 and the counting signals IN<2n−1> of the group G2 in correspondence to the mode signals MODE_A and MODE_B. When the mode signal MODE_A is activated, the selection part 222 selects the counting signals IN<2n−1> of the group G2. However, when the mode signal MODE_B is activated, the selection part 222 selects the counting signals IN<n−1> of the group G1.

A signal outputted from the selection part 222 is fed back to the flip-flop F/F1 of the first stage. The selection part 222 may include a multiplexer.

The combination section 223 includes a plurality of NAND gates ND1 to NDB, a plurality of inverters IV1 to IV9, and a plurality of selection parts 224 to 227. The plurality of selection parts 224 to 227 may include multiplexers, respectively.

The NAND gate ND1 performs a NAND operation on the input signal PIN and the counting signal IN<0> of the first flip-flop F/F1. The inverter IV2 inverts the output of the NAND gate ND1 and outputs the input control signal PI<0>.

Furthermore, the NAND gate ND2 performs a NAND operation on the input signal PIN and the counting signal IN<1> of the second flip-flop F/F2. The inverter IV3 inverts the output of the NAND gate ND2 and outputs the input control signal PI<1>.

Furthermore, the NAND gate ND3 performs a NAND operation on the input signal PIN and the counting signal IN<n−2> of the flip-flop F/F3. The inverter IV4 inverts the output of the NAND gate ND3 and outputs the input control signal PI<n−2>.

Furthermore, the NAND gate ND4 performs a NAND operation on the input signal PIN and the counting signals IN<n−1> of the flip-flop F/F4. The inverter IV5 inverts the output of the NAND gate ND4 and outputs the input control signal PI<n−1>.

The selection part 224 selects any one of the counting signal IN<n> of the first flip-flop F/F5 of the group G2 and the counting signal IN<0> of the first flip-flop F/F1 of the group G1 in correspondence to the mode signals MODE_A and MODE_B. The selection part 224 then outputs a selection signal IND<n>.

When the mode signal MODE_A is activated, the selection part 224 selects the counting signal IN<n> of the group G2. However, when the mode signal MODE_B is activated, the selection part 224 selects the counting signal IN<0> of the group G1.

Furthermore, the selection part 225 selects any one of the counting signal IN<n+1> of the second flip-flop F/F6 of the group G2 and the counting signal IN<1> of the second flip-flop F/F2 of the group G1 in correspondence to the mode signals MODE_A and MODE_B. The selection part 225 then outputs a selection signal IND<n+1>.

When the mode signal MODE_A is activated, the selection part 225 selects the counting signal IN<n+1> of the group G2. However, when the mode signal MODE_B is activated, the selection part 225 selects the counting signal IN<1> of the group G1.

Furthermore, the selection part 226 selects any one of the counting signal IN<2n−2> of the third flip-flop F/F7 of the group G2 and the counting signal IN<n−2> of the third flip-flop F/F3 of the group G1 in correspondence to the mode signals MODE_A and MODE_B. The selection part 226 then outputs a selection signal IND<2n−2>.

When the mode signal MODE_A is activated, the selection part 226 selects the counting signal IN<2n−2> of the group G2. However, when the mode signal MODE_B is activated, the selection part 226 selects the counting signal IN<n−2> of the group G1.

Furthermore, the selection part 227 selects any one of the counting signal IN<2n−1> of the flip-flop F/F8 of the last stage of the group G2 and the counting signals IN<n−1> of the flip-flop F/F4 of the last stage of the group G1 in correspondence to the mode signals MODE_A and MODE_B. Further, the selection part 227 outputs a selection signal IND<2n−1>.

When the mode signal MODE_A is activated, the selection part 227 selects the counting signal IN<2n−1> of the group G2. However, when the mode signal MODE_B is activated, the selection part 227 selects the counting signal IN<n−1> of the group G1.

Furthermore, the NAND gate ND5 performs a NAND operation on the input signal PIN and the selection signal IND<n> of the selection part 224. The inverter IV6 inverts the output of the NAND gate ND5 and outputs the input control signal PI<n>.

Furthermore, the NAND gate ND6 performs a NAND operation on the input signal PIN and the selection signal IND<n+1> of the selection part 225. The inverter IV7 inverts the output of the NAND gate ND6 and outputs the input control signal PI<n+1>.

Furthermore, the NAND gate ND7 performs a NAND operation on the input signal PIN and the selection signal IND<2n−2> of the selection part 226. The inverter IV8 inverts the output of the NAND gate ND7 and outputs the input control signal PI<2n−2>.

Furthermore, the NAND gate ND8 performs a NAND operation on the input signal PIN and the selection signal IND<2n−1> of the selection part 227. The inverter IV9 inverts the output of the NAND gate ND8 and outputs the input control signal PI<2n−1>.

As described above, pulses of the input control signals PI<0:2n−1> outputted from the combination section 223 are enabled or disabled according to the output values of the flip-flops F/F1 to F/F8.

Figure 4:
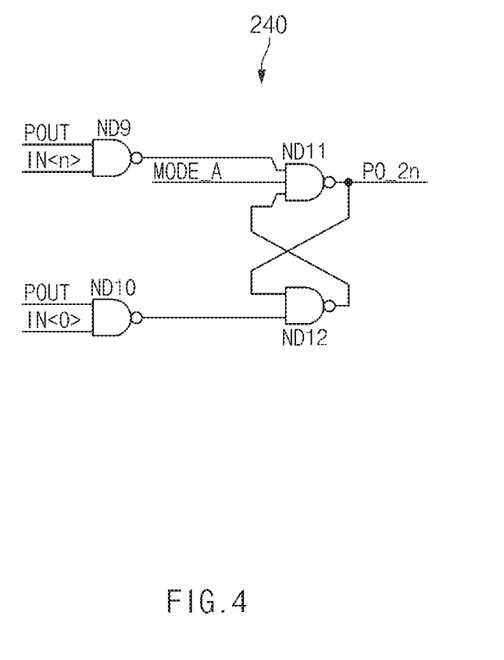
FIG. 4 is a detailed circuit diagram illustrating an output control unit of FIG. 2.

Referring to FIG. 4, a detailed circuit diagram illustrating the output control unit 240 of FIG. 2 is described.

A detailed configuration for outputting the output control signals PO<0:2n−1> from the output control unit 240 is as illustrated in FIG. 3. Hereinafter, the detailed configuration for outputting the selection control signal PO_2n from the output control unit 240 will be described.

The output control unit 240 includes a plurality of NAND gates ND9 to ND12. The NAND gate ND9 performs a NAND operation on the output signal POUT and the counting signal IN<n> of the flip-flop F/F5 of the first stage of the group G2. The NAND gate ND10 performs a NAND operation on the output signal POUT and the counting signal IN<0> of the flip-flop F/F1 of the first stage of the group G1.

Furthermore, the NAND gate ND11 performs a NAND operation on the output of the NAND gate ND9, the mode signal MODE_A, and the output of the NAND gate ND12, and outputs the selection control signal PO_2n. Furthermore, the NAND gate ND12 performs a NAND operation on the selection control signal PO_2n and the output of the NAND gate ND10, and outputs an operation result to the NAND gate ND11. The NAND gates ND11 and ND12 are electrically coupled to each other in an SR latch structure.

As described above, when the output signal POUT and the counting signal IN<n> of the group G2 have been activated and the mode signal MODE_A has been activated, the output control unit 240 outputs the selection control signal PO_2n at a low level. When the mode signal MODE_A has been activated, the groups G1 and G2 of the input control unit 220 are all used.

However, when the output signal POUT and the counting signal IN<0> of the group G1 have been activated and the mode signal MODE_A has been deactivated, the output control unit 240 outputs the selection control signal PO_2n at a high level. When the mode signal MODE_A has been deactivated, only the group G1 of the input control unit 220 is used.

Figure 5:
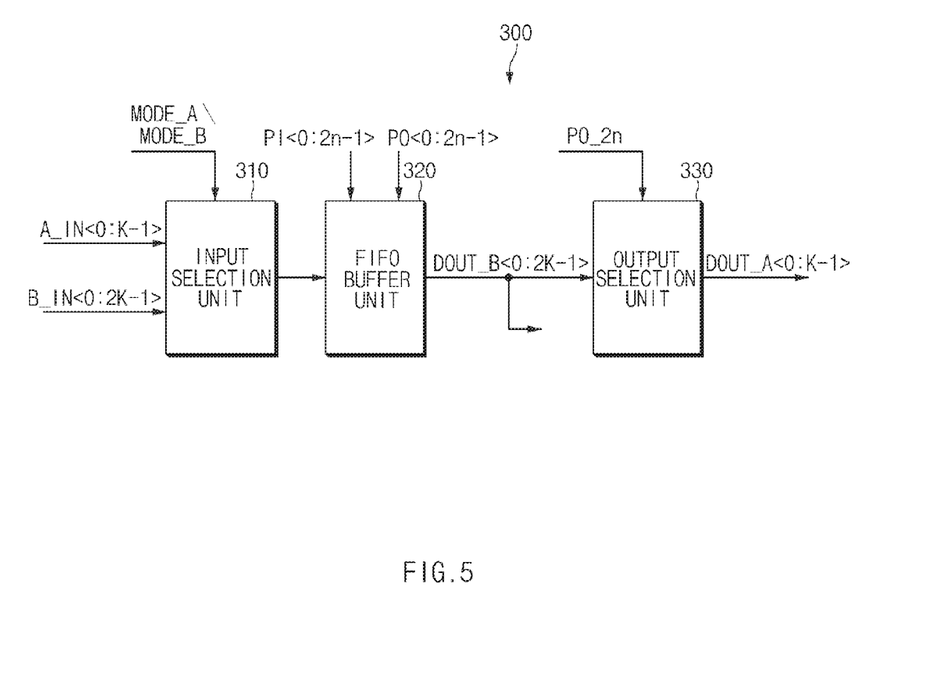
FIG. 5 is a configuration diagram illustrating a buffer block of FIG. 1.

Referring to FIG. 5, a configuration diagram illustrating the buffer block 300 of FIG. 1 is described.

The buffer block 300 includes an input selection unit 310, a FIFO (First-In First-Out) buffer unit 320, and an output selection unit 330. The input selection unit 310 and the output selection unit 330 may include multiplexers, respectively.

The input selection unit 310 selects any one of the input data A_IN<0:K−1> and B_IN<0:2K−1> in correspondence to the mode signals MODE_A and MODE_B. When the mode signal MODE_A has been activated, the input selection unit 310 selects the input data A_IN<0:K−1>. However, when the mode signal MODE_B has been activated, the input selection unit 310 selects the input data B_IN<0:2K−1>.

In the case of a delay circuit in which data should be latched and outputted after a predetermined time, when the delay time becomes long, since the size of a latch increases, it occupies a large area. To solve such a problem, a method capable of storing and outputting a predetermined number of data through indexing is used.

For example, there is a CWL (Cas Write Latency; latency until external write data is inputted after a write command is applied) delay circuit in a DRAM.

A role of the circuit is to store an address to be written during a predetermined time tCK set by a MRS (Mode Register Set), output a write flag and the address when a desired timing is reached, and generate a write internal command.

In such a case, during a clock cycle to be delayed, the address may be transferred trough a shift register. However, when the address is transferred trough the shift register, since a large area is used, a data latch capable of performing a FIFO (First-In First-Out) operation is used.

Such a FIFO buffer unit 320 buffers data applied from the input selection unit 310 in correspondence to the input control signals PI<0:2n−1> and the output control signals PO<0:2n−1>, and outputs the output data DOUT_B<0:2K−1>. When the input control signals PI<0:2n−1> are applied, the FIFO buffer unit 320 stores input data in corresponding latches. When the output control signals PO<0:3> are applied, the FIFO buffer unit 320 outputs data stored in a corresponding index.

The FIFO buffer unit 320 sequentially latches data applied from the input selection unit 310 by the input control signals PI<0:2n−1>. Further, the FIFO buffer unit 320 sequentially outputs data to the output selection unit 330 by the output control signals PO<0:2n−1>.

Then, the output selection unit 330 selectively outputs the output data DOUT_A<0:K−1> in correspondence to the selection control signal PO_2n.

At the time of activation of the selection control signal PO_2n, the output selection unit 330 selects the output data DOUT_B<0:K−1> corresponding to ½ of the output data DOUT_B<0:2K−1> and outputs the output data DOUT_A<0:K−1>. However, at the time of deactivation of the selection control signal PO_2n, the output selection unit 330 outputs the output data DOUT_B<K:2K−1> corresponding to ½ of the output data DOUT_B<0:2K−1> as the output data DOUT_A<0:K−1>.

When the amount of data to be delayed is large and data to be simultaneously stored is large, a data latch also occupies a large area. However, if the FIFO buffer unit 320 can be shared by the plurality of shifters 110 and 120 that output different types of data, the improvement of an area is possible.

When the FIFO buffer unit 320 is used by elements (for example, the shifters 110 and 120) different from each other, data bit widths and a delay time (the number of latches that simultaneously operate) required in order to satisfy each operation may differ.

However, in an embodiment of the invention, even when the sizes of the input data A_IN<0:K−1> and B_IN<0:2K−1> are different from each other, the latches of the FIFO buffer unit 320 can be shared for use.

Figure 6:
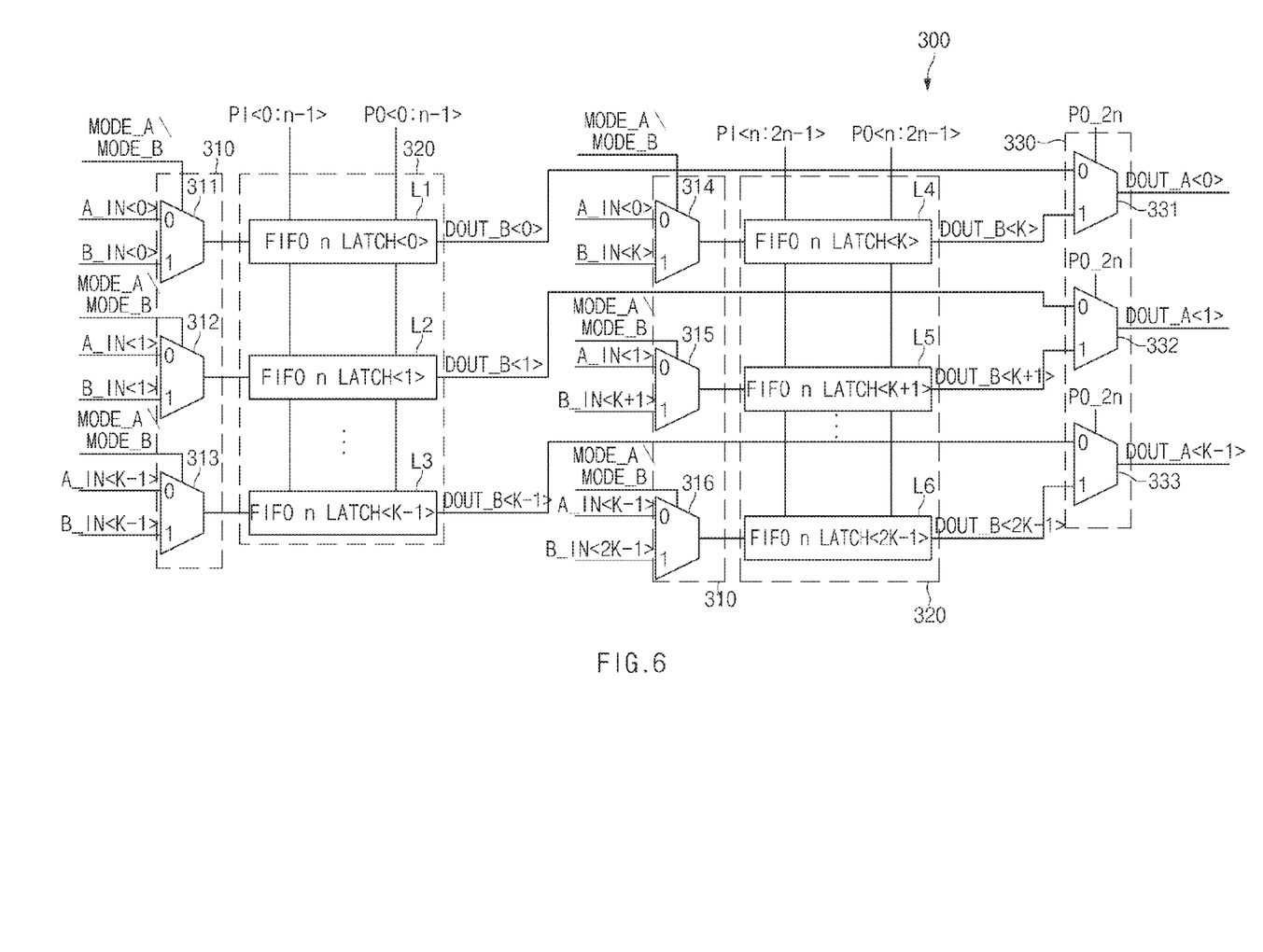
FIG. 6 is a detailed configuration diagram illustrating a buffer block of FIG. 5.

Referring to FIG. 6, a detailed configuration diagram illustrating the buffer block 300 of FIG. 5 is described.

The input selection unit 310 includes a plurality of selection sections 311 to 313. The plurality of selection sections 311 to 313 may include multiplexers, respectively.

Each of the plurality of selection sections 311 to 313 selects any one of the input data A_IN<0:K−1> and B_IN<0:2K−1> in correspondence to the mode signals MODE_A and MODE_B.

When the mode signal MODE_A has been activated, the selection section 311 selects the input data A_IN<0>. However, when the mode signal MODE_B has been deactivated, the selection section 311 selects the input data B_IN<0>.

Furthermore, when the mode signal MODE_A has been activated, the selection section 312 selects the input data A_IN<1>. However, when the mode signal MODE_B has been deactivated, the selection section 312 selects the input data B_IN<1>.

Furthermore, when the mode signal MODE_A has been activated, the selection section 313 selects the input data A_IN<K-1>. However, when the mode signal MODE_B has been deactivated, the selection section 313 selects the input data B_IN<K-1>.

When the mode signal MODE_A has been activated, the selection section 314 selects the input data A_IN<0>. However, when the mode signal MODE_B has been deactivated, the selection section 314 selects the input data B_IN<K>.

When the mode signal MODE_A has been activated, the selection section 315 selects the input data A_IN<1>. However, when the mode signal MODE_B has been deactivated, the selection section 315 selects the input data B_IN<K+1>.

When the mode signal MODE_A has been activated, the selection section 316 selects the input data A_IN<K-1>. However, when the mode signal MODE_B has been deactivated, the selection section 316 selects the input data B_IN<2K-1>.

The FIFO buffer unit 320 includes 2K FIFO latches <0:2K-1> L1 to L6. The plurality of FIFO latches <0:2K-1> L1 to L6 may be arranged in an array of K rows×2 columns.

K FIFO latches <0:K-1> L1 to L3 corresponding to ½ of the 2K FIFO latches <0:2K-1> L1 to L6 operate in correspondence to input control signals PI<0:n-1> and the output control signals PO<0:n-1>. Such FIFO latches <0:K-1> L1 to L3 buffer data applied from the selection sections 311 to 313 and output the output data DOUT_B<0:K-1>.

Furthermore, K FIFO latches <K:2K-1> L4 to L6 corresponding to ½ of the 2K FIFO latches <0:2K-1> L1 to L6 operate in correspondence to the input control signals PI<n:2n-1> and the output control signals PO<n:2n-1>. Such FIFO latches <K:2K-1> L4 to L6 buffer data applied from the selection sections 314 to 316 and output the output data DOUT_B<K:2K-1>.

In an embodiment of the invention, the example, in which the latches of the buffer block 300 include the FIFO latches L1 to L6, has been described. However, an embodiment of the invention is not limited thereto, and can be applied to all data latches utilizing an index as well as the FIFO operation.

Furthermore, the output selection unit 330 includes a plurality of selection sections 331 to 333. The plurality of selection sections 331 to 333 may include multiplexers, respectively.

Each of the plurality of selection sections 331 to 333 selects any one of the output data DOUT_B<0:K-1> and DOUT_B<K:2K-1> in correspondence to the selection control signal PO_2n.

When the selection control signal PO_2n has been activated, the selection section 331 selects the output data DOUT_B<0>. However, when the selection control signal PO_2n has been deactivated, the selection section 331 selects the output data DOUT_B<K>.

Furthermore, when the selection control signal PO_2n has been activated, the selection section 332 selects the output data DOUT_B<1>. However, when the selection control signal PO_2n has been deactivated, the selection section 332 selects the output data DOUT_B<K+1>.

Furthermore, when the selection control signal PO_2n has been activated, the selection section 333 selects the output data DOUT_B<K-1>. However, when the selection control signal PO_2n has been deactivated, the selection section 333 selects the output data DOUT_B<2K+1>.

As described above, at the time of activation of the mode signal MODE_A, the buffer block 300 combines two FIFO latches positioned in one row and outputs one piece of data DOUT_A<0:K-1>. However, at the time of activation of the mode signal MODE_B, the buffer block 300 outputs DOUT_B<0:2K-1> corresponding to respective FIFO latches.

For example, when the mode signal MODE_A is activated, the number of data to be delayed is 4 bits and the number of simultaneously storable data is 2n (n is a natural number). When the mode signal MODE_B is activated, the number of data to be delayed is 8 bits and the number of simultaneously storable data is n (n is a natural number).

When the mode signal MODE_A is activated, the values of latches (for example, the latches L1 to L3 or the latches L4 to L6) corresponding to ½ of the plurality of FIFO latches L1 to L6 are selected by the operation of the output selection unit 330 and the data DOUT_A<0:K-1> is outputted. However, when the mode signal MODE_B is activated, the output of all the FIFO latches L1 to L6 is selected and the data DOUT_B<0:2K-1> is outputted.

Figure 7:
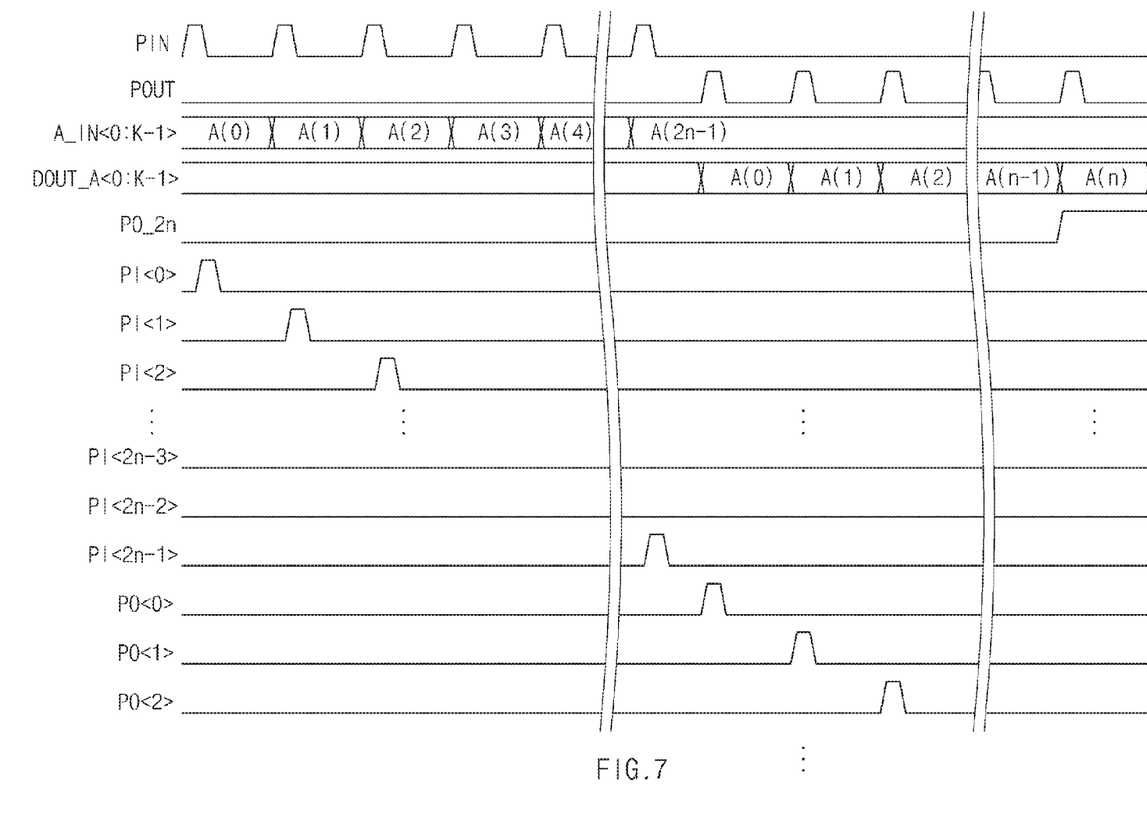
FIG. 7 and FIG. 8 are operation timing diagrams for explaining an operation of a data transfer device according to an embodiment of the invention.
Figure 8:
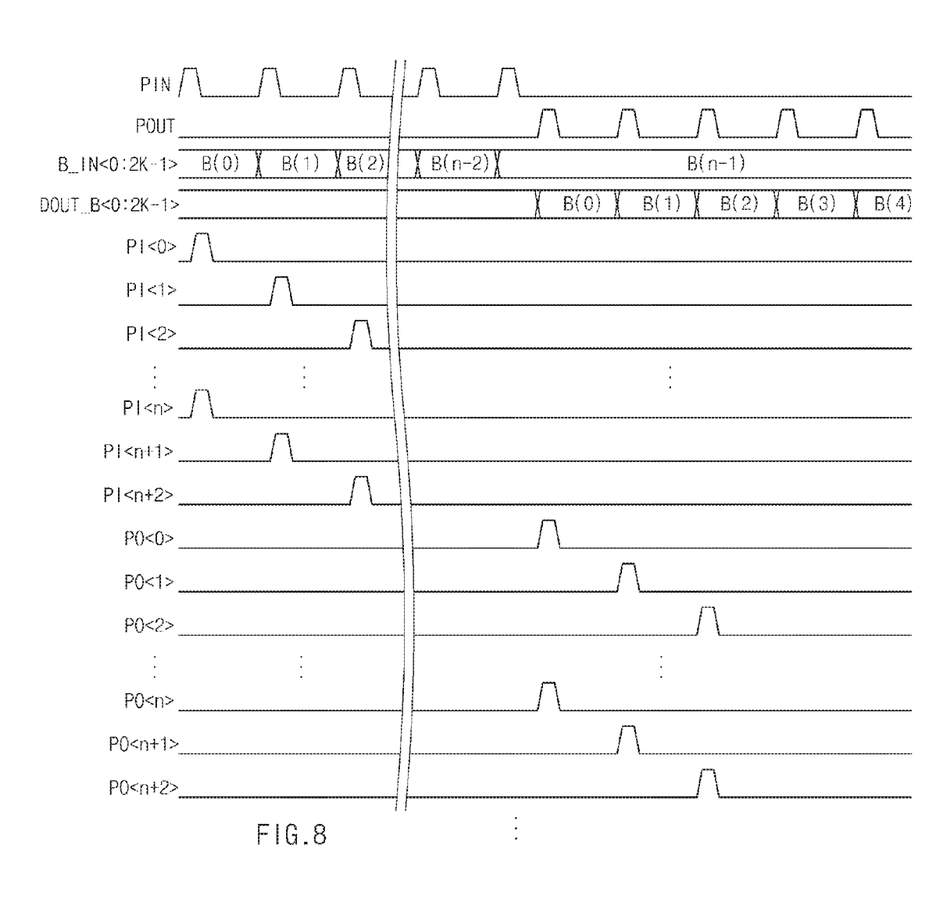

Referring to FIG. 7 and FIG. 8, operation timing diagrams for explaining an operation of the data transfer device according to an embodiment of the invention are described.

FIG. 7 illustrates the operation of the buffer block 300 when the mode signal MODE_A is activated. FIG. 8 illustrates the operation of the buffer block 300 when the mode signal MODE_B is activated.

In FIG. 7, when the input signal PIN is applied to the input control unit 220, the 2n input control signals PI<0:2n-1> are sequentially activated corresponding to the input signal PIN. Then, the input data A_IN<0:K-1> is sequentially inputted corresponding to the input control signals PI<0:2n-1> so that 2n pieces of data is stored in the FIFO latches L1 to L6. FIG. 7 also illustrates A(0) to A(n).

Furthermore, when the output signal POUT is applied to the output control unit 240, the 2n output control signals PO<0:2n-1> are sequentially activated corresponding to the output signal POUT. Then, n pieces of output data DOUT_A<0:K-1> is sequentially outputted corresponding to the output control signals PO<0:2n-1>.

At this time, when the selection control signal PO_2n is at a low level, only data outputted from the n FIFO latches L1 to L3 corresponding to ½ of the total 2n FIFO latches L1 to L6 is outputted as the output data DOUT_A<0:K-1>. After the n pieces of output data DOUT_A<0:K-1> is outputted from the FIFO latches L1 to L3, the selection control signal PO_2n is transitioned to a high level.

IN FIG. 8, when the input signal PIN is applied to the input control unit 220. Then, the n input control signals PI<0:n-1> are sequentially activated and the n input control signals PI<n:2n-1> are sequentially activated Accordingly, the input data A_IN<0:K-1> is sequentially inputted corresponding to the input control signals PI<0:2n-1>, so that n pieces of data is stored in the FIFO latches L1 to L3 and n pieces of data is stored in the FIFO latches L4 to L6.

Furthermore, when the output signal POUT is applied to the output control unit 240, the n output control signals PO<0:n-1> are sequentially activated and n output control signals PO<0:2n-1> are sequentially activated corresponding to the output signal POUT. Then, n pieces of output data DOUT_B<0:K-1> is sequentially outputted corresponding to the output control signals PO<0:n-1> and n pieces of output data DOUT_B<n:2K-1> is sequentially outputted.

FIG. 8 also illustrates B(0) to B(n−2), B(0) to B(4), and PI(0) to PI<n+2> and PO<0> to PO<n+2>.

As described above, sharing of two data delay circuits exclusively used in an embodiment of the invention is possible. Furthermore, even though data bit widths and the number of data, which can be simultaneously latched, are different from each other in delay operations of the two delay circuits, sharing of latches is possible.

Figure 9:
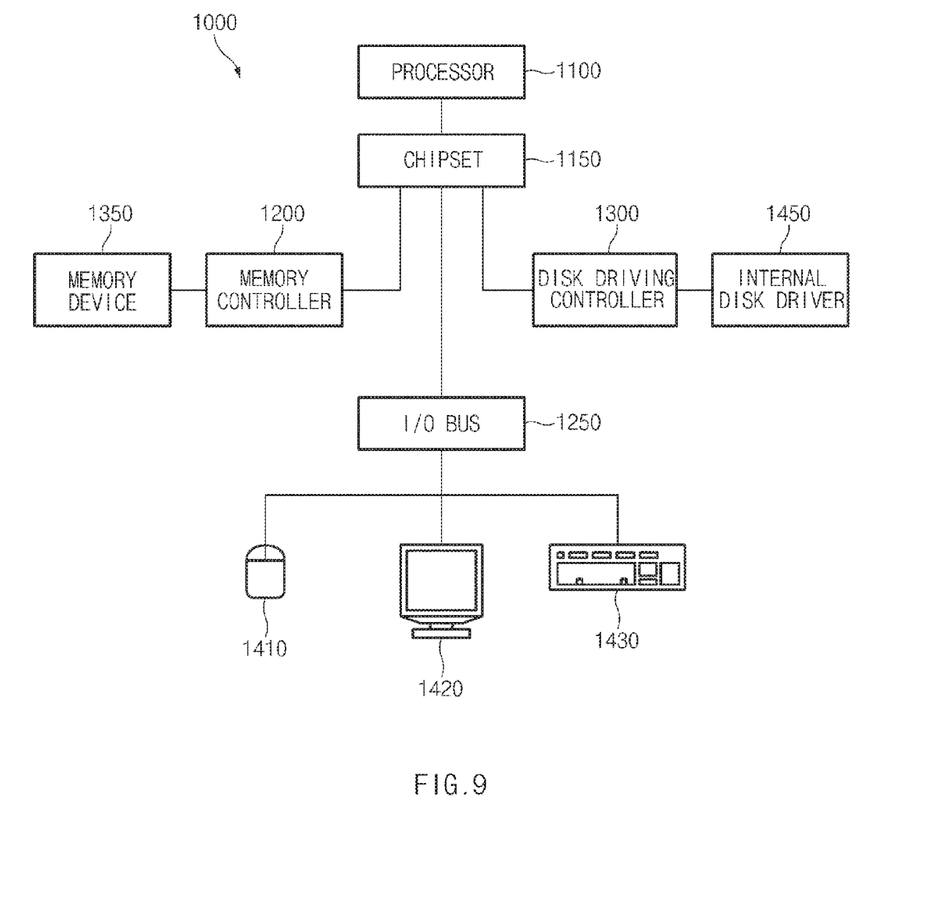
FIG. 9 illustrates a block diagram of a system employing a memory controller circuit in accordance with an embodiment of the invention.

Referring to FIG. 9, a system 1000 may include one or more processors 1100. The processor 1100 may be used individually or in combination with other processors. A chipset 1150 may be electrically coupled to the processor 1100. The chipset 1150 is a communication pathway for signals between the processor 1100 and other components of the system 1000. Other components may include a memory controller 1200, an input/output ("I/O") bus 1250, and a disk driving controller 1300. Depending on the configuration of the system 1000, any one of a number of different signals may be transmitted through the chipset 1150.

The memory control 1200 may be electrically coupled to the chipset 1150. The memory controller 1200 can receive a request provided from the processor 1100 through the chipset 1150. The memory controller 1200 may be electrically coupled to one or more memory devices 1350. The memory devices 1350 may include the data transfer device described above.

The chipset 1150 may also be electrically coupled to the I/O bus 1250. The I/O bus 1250 may serve as a communication pathway for signals from the chipset 1150 to I/O devices 1410, 1420 and 1430. The I/O devices 1410, 1420 and 1430 may include a mouse 1410, a video display 1420 or a keyboard 1430. The I/O bus 1250 may employ any one of a number of communications protocols to communicate with the I/O devices 1410, 1420 and 1430.

The disk driving controller 1300 may also be electrically coupled to the chipset 1150. The disk driving controller 1300 may serve as the communication pathway between the chipset 1150 and one or more internal disk drivers 1450. The disk driving controller 1300 and the internal disk drivers 1450 may communicate with each other or with the chipset 1150 using virtually any type of communication protocol.

While various embodiments have been described above, it will be understood to those skilled in the art that the embodiments described are by way of examples only. Accordingly, the data transfer device described should not be limited based on the described embodiments.

What is claimed is:

1. A data transfer device comprising:
   a shifter block that generates a first input signal and a second input signal with different data formats, and a first output signal and a second output signal with different data formats;
   an input/output control block that selects the first input signal and the first output signal according to a mode signal and outputs an input control signal and an output control signal for controlling a data input/output operation, or selects the second input signal and the second output signal and outputs the input control signal and the output control signal; and
   a buffer block that latches first input data or second input data which have different data bit widths according to the input control signal, and outputs first output data or second output data which have different data bit widths according to the output control signal,
   wherein the input/output control block comprises:
   a first selection circuit that selects any one of the first input signal and the second input signal according to the mode signal;
   an input control circuit that outputs the input control signal according to output of the first selection circuit and the mode signal;
   a second selection circuit that selects any one of the first output signal and the second output signal according to the mode signal; and
   an output control circuit that outputs the output control signal and a selection control signal according to output of the second selection circuit and the mode signal.

2. The data transfer device of claim 1, wherein the shifter block comprises:
   a first shifter that generates the first input signal and the first output signal; and
   a second shifter that generates the second input signal and the second output signal.

3. The data transfer device of claim 2, wherein the first shifter has a data latency longer than a data latency of the second shifter and is set to a data format having a specific data bit width.

4. The data transfer device of claim 1, wherein the second input data has a data bit width twice as large as the first input data, and the second output data has a data bit width twice as large as the first output data.

5. The data transfer device of claim 1, wherein the input control circuit comprises:
   a signal generation section that sequentially activates a plurality of counting signals according to the output of the first selection circuit and the mode signal; and
   a combination section that combines the output of the first selection circuit, the plurality of counting signals, and the mode signal and outputs the input control signal.

6. The data transfer device of claim 5, wherein the signal generation section comprises:
   a plurality of flip-flops that change and output logic levels of the plurality of counting signals according to an output signal of the first selection circuit, and are divided into a first group and a second group; and
   a third selection circuit that selects any one of an output of the first group and an output of the second group according to the mode signal,
   wherein the first group and the second group include substantially a same number of flip-flops.

7. The data transfer device of claim 6, wherein the plurality of flip-flops have a ring counter structure in which the plurality of flip-flops are serially electrically coupled and an output signal is fed back as an input signal,
   wherein, in the plurality of flip-flops, only the first group is selected or both the first and second groups are selected by the mode signal, resulting in a change in a number of flip-flops that are activated.

8. The data transfer device of claim 6, wherein, among the plurality of flip-flops, an initial operation of a flip-flop of an initial stage is set by a set signal and the remaining flip-flops are initialized by a reset signal.

9. The data transfer device of claim 6, wherein the combination section combines the output of the first group and the output of the second group with each other according to the mode signal and outputs the input control signal, or outputs the output of the first group as the input control signal.

10. The data transfer device of claim 5, wherein the combination section selectively enables or disables and outputs pulses of $2n$ input control signals according to values of the plurality of counting signals,
    wherein n is a number greater than or equal to zero.

11. The data transfer device of claim 1, wherein, when the mode signal is activated, since the selection control signal is activated, the output control circuit selects the first output data, and when the mode signal is deactivated, since the selection control signal is deactivated, the output control circuit does not select the first output data.

12. The data transfer device of claim 1, wherein the buffer block comprises:
an input selection circuit that selects any one of the first input data and the second input data according to the mode signal;
a buffer circuit that latches data applied from the input selection circuit according to the input control signal, and outputs the latched data as the second output data according to the output control signal; and
an output selection circuit that combines the second output data according to the selection control signal applied from the input/output control block, and outputs the first output data.

13. The data transfer device of claim 12, wherein the input selection circuit selects K pieces of the first input data when the mode signal is activated, and selects 2K pieces of the second input data when the mode signal is deactivated,
wherein K is a number greater than or equal to zero.

14. The data transfer device of claim 12, wherein the buffer block includes a plurality of FIFO (First-In First-Out) latches.

15. The data transfer device of claim 12, wherein the buffer block latches K pieces of the first input data when the mode signal is activated, and latches 2K pieces of the second input data and outputs 2K pieces of the second output data when the mode signal is deactivated,
wherein K is a number greater than or equal to zero.

16. The data transfer device of claim 12, wherein the buffer block includes 2K latches, and outputs 2K pieces of the second output data or K pieces of the first output data according to the mode signal,
wherein K is a number greater than or equal to zero.

17. The data transfer device of claim 16, wherein, when the mode signal is activated, the output selection circuit selects output of K latches of the 2K latches according to the selection control signal, and outputs the first output data.

18. A data transfer device comprising:
a first shifter configured to output a first input signal and a first output signal;
a second shifter configured to output a second input signal and a second output signal;
an input/output control block configured to receive the first and second input signals and the first and second output signals to output output control signals and input control signals; and
a buffer block configured to receive the input control signals and the output control signals and output first output data and second output data,
wherein the input/output control block comprises:
a first selection circuit that selects any one of the first input signal and the second input signal according to a mode signal;
an input control circuit that outputs the input control signals according to output of the first selection circuit and the mode signal;
a second selection circuit that selects any one of the first output signal and the second output signal according to the mode signal; and
an output control circuit that outputs the output control signals according to output of the second selection circuit and the mode signal.

19. The data transfer device of claim 18, wherein the buffer block is shared when the first shifter and the second shifter have different data formats.

20. A data transfer device comprising:
a shifter block configured to generate a first input signal, a second input signal, a first output signal and a second output signal;
an input/output control block configured to output input control signals and output control signals in response to the first input signal, the second input signal, the first output signal and the second output signal; and
a buffer block configured to buffer first input data and second input data in response to the input control signals and the output control signals and output first output data and second output data,
wherein the input/output control block comprises:
a first selection circuit that selects any one of the first input signal and the second input signal according to a mode signal;
an input control circuit that outputs the input control signals according to output of the first selection circuit and the mode signal;
a second selection circuit that selects any one of the first output signal and the second output signal according to the mode signal; and
an output control circuit that outputs the output control signals according to output of the second selection circuit and the mode signal.

* * * * *